United States Patent [19]
Goto

[11] Patent Number: 5,313,408
[45] Date of Patent: May 17, 1994

[54] MULTISTATION DISPLAY SYSTEM FOR CONTROLLING A DISPLAY MONITOR ASSOCIATED WITH PLURAL AUDIO VIDEO DEVICES

[75] Inventor: Takeshi Goto, Shijonawate, Japan

[73] Assignee: Matsushita Electric Industrial Co., Ltd., Tokyo, Japan

[21] Appl. No.: 675,525

[22] Filed: Mar. 26, 1991

[30] Foreign Application Priority Data

Mar. 26, 1990 [JP] Japan .................................... 2-76052

[51] Int. Cl.⁵ ............................................ G06F 15/16
[52] U.S. Cl. .................................. 364/514; 395/200; 395/154; 340/825.08
[58] Field of Search ................ 364/514; 395/154, 155, 395/162, 163, 164, 165, 200; 340/716, 718, 825.08

[56] References Cited

U.S. PATENT DOCUMENTS

| | | | |
|---|---|---|---|
| 4,343,042 | 8/1982 | Schrock et al. | |
| 4,601,560 | 7/1986 | Bahr et al. | 395/200 |
| 4,751,630 | 6/1988 | Kelly, Jr. et al. | 395/200 |
| 4,766,530 | 8/1988 | Roslund | 395/200 |
| 4,954,965 | 9/1990 | Johnson et al. | 364/514 |
| 4,977,782 | 12/1990 | Stohr et al. | |
| 4,991,121 | 2/1991 | Minoura et al. | 395/154 |
| 5,058,185 | 10/1991 | Morris et al. | 395/155 |
| 5,077,655 | 12/1991 | Jinzaki | 395/200 |

FOREIGN PATENT DOCUMENTS 0094794 of 0000 European Pat. Off.
0158548 of 0000 European Pat. Off.
0314572 of 0000 European Pat. Off.

Primary Examiner—Kevin J. Teska
Assistant Examiner—Jae H. Choi
Attorney, Agent, or Firm—Wenderoth, Lind & Ponack

[57] ABSTRACT

Plural information display stations, such as audio video devices, are commonly connected to an information transmission path which transmits data frames among the display stations to provide data communication therebetween. Display information from the plural display stations is readily displayed on a common display monitor of one of the display stations. The display station containing the monitor transmits an inquiry on the information path for the purpose of determining which of the other display stations contains display information. The addresses of the other stations which transmit an affirmative reply in response to the inquiry are stored. Also, the display station containing the display monitor transmits another inquiry to determine the type of contents of the display information of the other display stations. The type of contents transmitted in response to this inquiry are also stored. Additionally, the control right of the display on the display monitor may be transferred among the plural display stations.

2 Claims, 9 Drawing Sheets

Fig. 4

(1) method 1 for taking over picture to other stations take over by BRANCH

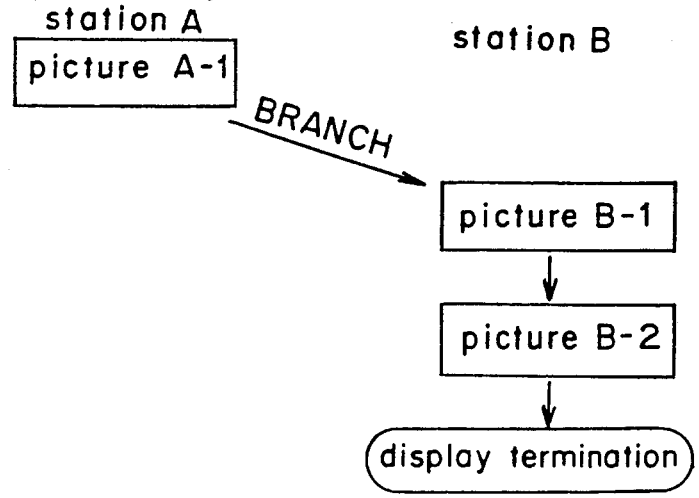

(2): example of BRANCH notification frame (only command portion)

| BRANCH notification command | picture number to be initially displayed |
|---|---|
| OPECODE | OPERAND |

(3): method 2 for taking over picture to other stations take over by CALL

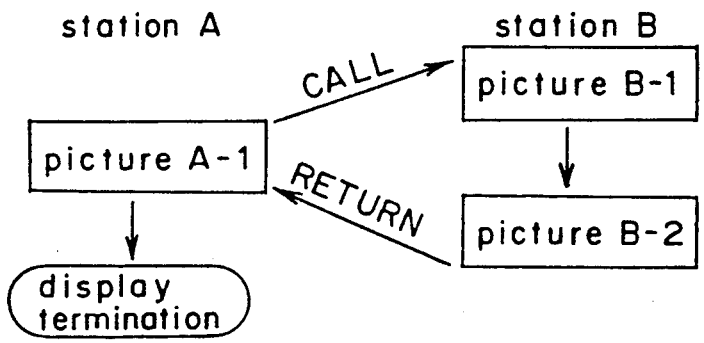

(4): example of CALL notification frame (only command portion)

| CALL notification command | picture number to be initially displayed |
|---|---|
| OPECODE | OPERAND |

(5): example of RETURN notification frame (only command portion)

| RETURN notification command |
|---|
| OPECODE |

MULTISTATION DISPLAY SYSTEM FOR CONTROLLING A DISPLAY MONITOR ASSOCIATED WITH PLURAL AUDIO VIDEO DEVICES

BACKGROUND OF THE INVENTION

The present invention generally relates to an audio video system having audio video devices such as televisions, VTR, and audio equipment connected at a plurality of stations to a common information transmission path, and more particularly, to a picture display method for displaying the functional displays of the respective stations on a monitor display screen to allow users to input operational commands in accordance with the monitor displays.

Conventionally, when the functional displays of all the stations connected in the system, and the displays of a menu are effected, the central computer retains all the functional displays and the picture data of all the stations to effect integrated control and processing of the displays as demanded by a user.

However, such conventional techniques have the following problems.

(1) Since the central computer controls the picture display data of all the stations connected to the system, the data amount to be controlled is enormous.

(2) Since the central computer controls the picture display data of all the stations connected to the system, it is difficult to cope with the picture displays of a new station when the new station is connected to the system, or even when the types or displays are replaced by new ones in a existing station.

As a method of solving the above described problems, the technique of Japanese domestic patent publication No. 2-146558 has been proposed.

This patent technique is characterized in that in a communication system in which a controller composed of a control portion, a display portion, an input portion and a communication control portion is connected via a common communication path to a plurality of terminals provided with a communication portion. A means is adapted to control the corresponding terminal by the selection of the control item and the control content displayed on the display portion of the controller so as to control the terminals from the controller. A plurality of types of basic picture displays to be displayed on the display portion are built in within the controller. A plurality of terminals connected with the common communication path respectively retain the picture information necessary for their own control. The picture information which is an object with respect to the data reception from the controller is transmitted to the controller so as to display on the display portion the picture necessary for the control effected on the side of the controller.

However, in the method of the above described patent, the following problems remain unsettled.

(1) The controller is required to previously contain the basic pictures of the terminals thus requiring that the terminals which may be connected with the audio video system be known in advance.

(2) Although the respective terminals contain the data to be displayed, the controller always has a control right of the picture display as to which terminal picture is displayed in which order, so that a terminal cannot on its own display a desired display in accordance with a demand of the user.

OBJECT AND SUMMARY OF THE INVENTION

Accordingly, the present invention has been developed with a view to substantially eliminate the above discussed drawbacks inherent in the prior art, and has for its essential object to provide an improved method of controlling the display of an audio video system.

According to the present invention, a multistation display system includes a plurality of information display stations each for executing respective data processings and generating corresponding display information, and an information transmission path commonly connected to the plurality of information display stations for transmitting data frames among the plurality of information display stations to provide data communication between the plurality of information display stations.

At least one of said plurality of information display stations includes (a) a communication control portion coupled to the information transmission path and including (i) communication processing means for transmitting data frames onto and receiving data frames from the information transmission path, (ii) frame decoding means for decoding data frames received by the communication processing means from the information transmission path, and (iii) frame generating means for generating data frames transmitted onto the information transmission path by the communication processing means, (b) an operation processing portion coupled to the communication control portion and including (i) a central processor means for executing display processing operations, and (ii) a memory means for storing data used by the central processor means upon executing the display processing operations, (c) a display processing portion coupled to the operation processing portion and including (i) a display data accommodation means for storing display information data indicative of the display contents of display information, (ii) a display number accommodating means for accommodating a display number associated with each display of each display information, and (iii) an address accommodation means for selectively storing addresses of other ones of the plurality of information display stations associated with display information data stored in the display data accommodation means, (d) a display monitor coupled to the operation processing portion, and (e) an input means, coupled to the operation processing portion, for inputting user commands.

According to one aspect of the invention, the operation processing portion includes means for causing the communication control portion to generate a first data frame to the plurality of information display stations containing a first inquiry as to whether each of the plurality of information display stations includes respective display information, for storing in the address accommodation means the addresses of each of the plurality of information display stations which transmit an affirmative reply in response to the first inquiry, for causing the communication control portion to generate a second data frame to the plurality of information display stations which include respective display information containing a second inquiry as to the contents of the respective display information, and for storing in the display data accommodation means the contents of the respective display information transmitted by the plurality of information display stations in response to the second inquiry.

According to another aspect of the present invention, the operation processing portion is responsive to a user command from the input means to execute a BRANCH NOTIFICATION sequence for transferring a display displayed on the display monitor from a first display associated with the at least one station to a second display associated with another of the plurality of information display stations said BRANCH NOTIFICATION sequence including transmitting to the other station a display transfer notification and an operand information specifying a display number of the second display, wherein a control right of the display of the display monitor is transferred to the other station and the second display is displayed on the display monitor.

According to still another aspect of the invention, the operation processing portion is responsive to a user command from the input means to execute a CALL NOTIFICATION sequence for transferring a display displayed on the display monitor from a first display associated with the at least one station to a second display associated with another of the plurality of information display stations, the CALL NOTIFICATION sequence including transmitting to the other station a display transfer notification and an operand information specifying a display number of the second display, wherein a control right of the display of the display monitor is transferred to the other station and the second display is displayed on the display monitor, and then receiving a return notification which is transmitted by the other station upon completion of display processing specified by the transfer notification and operand information, and, responsive to the return notification, restoring the control right of the display of the display monitor to the at least one station and display the first display on the display monitor.

According to the present invention, it becomes possible to retrieve previous items of display pictures of all the stations which are connected with the information transmission path, and the retrieved results may be used for deciding whether or not the picture of the item required by the user exists by registration of the retrieved results in the picture item control means.

According to the present invention, it also becomes possible to transfer the control right of the picture display to a station having the picture, when a demand for displaying the picture which does not exist in the original station has been received.

According to the present invention, it also becomes possible to temporarily transfer the control right of the picture display to the station having the picture, when a picture which does not exist in the original station has been demanded to be displayed, so as to restore the control right of the picture display to the original station again after the desired picture display processing operation has been effected.

According to the present invention, it also becomes possible to provides a picture displaying method capable of effecting the display without consideration by the user as to whether or not the desired picture is controlled by a particular station in the system.

Also, as each station retains only the picture related to its own functions, it is possible to display the picture desired by the user simply by the transferring of the display to the station in the picture displayed related to the other station, thus making it possible to effect the dispersion control of the pictures. Therefore, it becomes possible to provide a picture displaying apparatus which is easily expandable.

BRIEF DESCRIPTION OF THE DRAWINGS

These and other objects and features of the present invention will become apparent from the following description taken in conjunction with the preferred embodiments thereof with reference to the accompanying drawings, in which;

FIG. 4 is a conceptual diagram of a picture transferring method in an embodiment of the present invention, including a picture transfer notification frame block diagram thereof;

DETAILED DESCRIPTION

Figure 1:
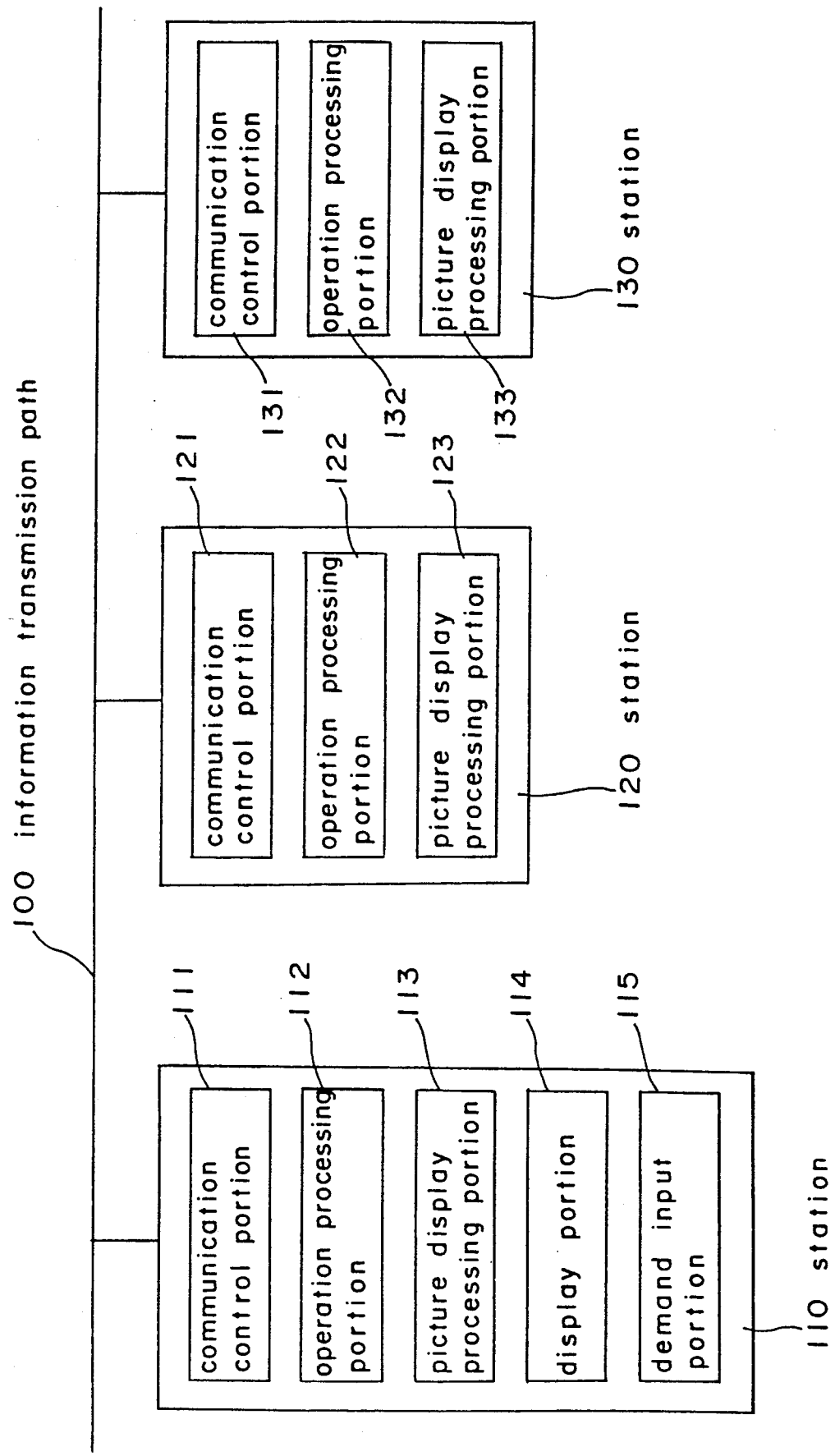
FIG. 1 is a block diagram showing the construction of an audio video system in an embodiment of the present invention.

Before the description of the present invention proceeds, it is to be noted that like parts are designated by like reference numerals throughout the accompanying drawings.

One embodiment of the present invention will be described hereinafter in detail with reference to the drawings.

(1) Summary Description of the System (1.1) Definitions

The system described here is an audio video system having audio video devices each being primarily composed as a station. That is, the audio video system is composed of a group of audio video devices which are commonly connected to a communication system provided with transmission property and code independence property. Information is transmitted in the communication system in variable length units called frames. The physical mechanism used for transmitting and receiving the information is called a communication control apparatus (or a communication control portion when built within an audio video device). The communication circuit which carries the information from one communication control apparatus to another communication control apparatus is called an information transmission path. Basic terminology used to aid in the understanding of the present invention is briefly described below with reference to FIGS. 6 and 7.

Stations 1002 through 1005: Apparatuses, including respective audio video devices, which are connected to an information transmission path 100 and which effect data communication functions with other stations.

Master Station: A station having current control priority in the communication system.

Slave Stations: Stations specified by the master and responsive to commands from the master.

Transmitter Station: A station which transmits data placed within the message field of a frame.

Receiver Station: A station which receives the transmitted data placed within the message field of a frame.

Write Sequence: A process sequence where the master station becomes a transmitter station and transmits and/or commands data to respective slave stations. There are two types of write sequences, namely, a write command sequence and a write data sequence.

Read Sequence: A process sequence where the master station becomes a receiver station and receives data transmitted from slave stations.

Data Frame 1110: A unit of information which is transferred from station to station. Each frame is composed of a header field 1125, a master field 1126, a slave field 1127, a control field 1128, and a message field 1129.

Command Frame: A data frame in which the content of the message field 1129 is composed of commands.

Data Frame: A data frame in which the content of the message field 1129 is composed of data.

Command: A data code string transferred in a command frame with the processing content to be executed by a station which has received it being defined unificatively throughout the whole system. On the other hand, the processing contents to be executed by a station which has received it depend upon the received station.

Mode Bits 1112: Bits which distinguish the transfer speeds of a data frame and the transferable byte number of the messages.

Header Field 1125: A data region where the distinction between the start instructions of the data frame and the mode of the data frame is effected.

Master Field 1126: A data region containing the address of the master station.

Slave Field 1127: A data region containing the address of the slave station as specified by the master station.

Control Field 1128: A data region containing data denoting a transmission direction of the message filed in the frame, the type of data content in the message field and a lock control (described below).

Message Field 1129: A data region containing data of a transmitted message. This region may contain a plurality of successive blocks, each block including eight data bits 1121, an end of data bit 1122, a parity bit 1123, and an ACK bit 1124.

Arbitration: Collision control for deciding access priority when multiple stations attempt to start transmission of a frame at the same time. Arbitration is executed in a period of the header filed 1125 and the master field 1126.

Lock Control: A command function a master station specifies with respect to a station slave. The slave station which has received a lock control command is not responsive to commands from other master stations which would change the condition of the slave station during a period in which the lock control is engaged.

(1.2) Basic Construction of the System

Figure 6:
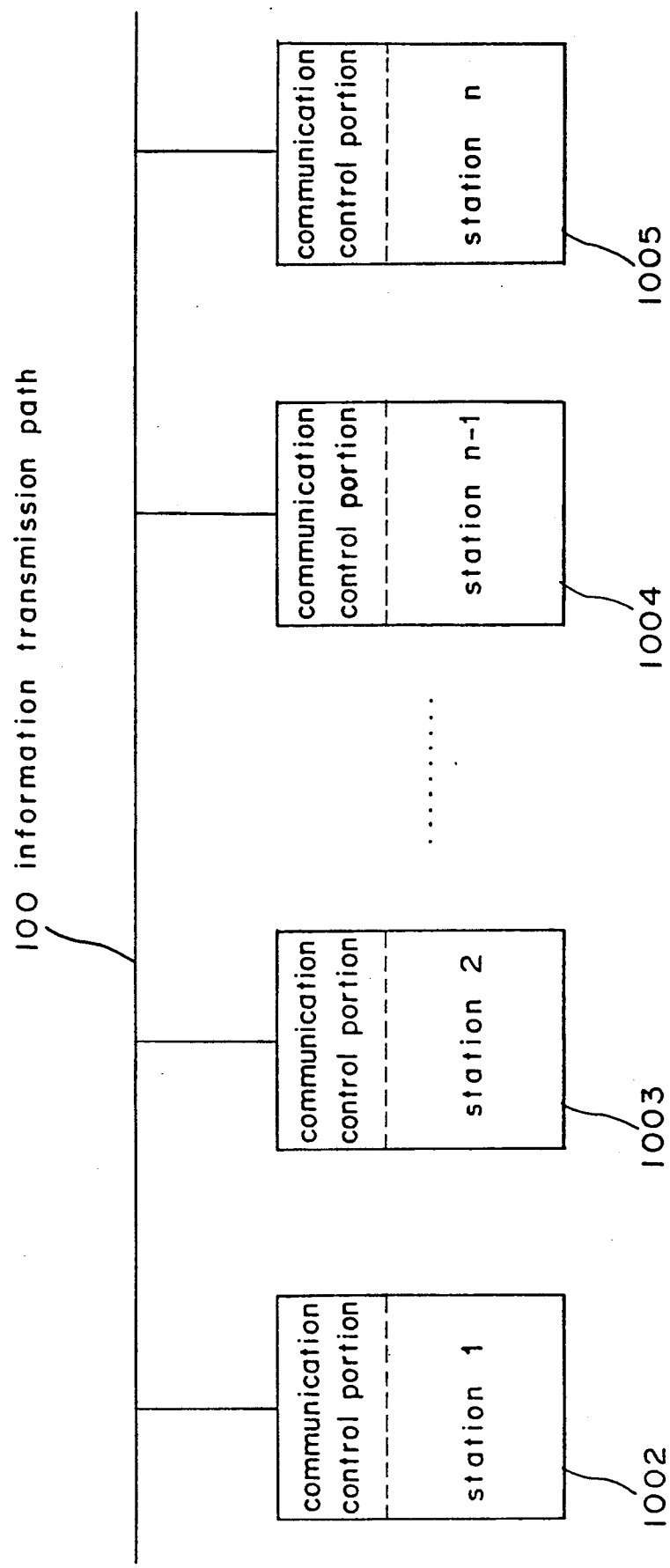
FIG. 6 is a block diagram showing the basic construction of an audio video system to which the present invention has been applied.

FIG. 6 shows a basic construction of an audio video system to which the present invention has been applied. The information transmission path 100 of one system is commonly connected to respective communication control portions of a plurality of station 1002, 1003, . . . , 1005. Each station includes an audio video device such as a VTR, TV or CD player. Also, one or more stations may include, rather than an audio video device, a telecontrol apparatus for controlling audio video functions.

However, there is no central control apparatus for centrally controlling the overall operations in the entire system.

(1.3) Frame Format and Basic Communication Procedure

In the embodiment of the present invention, the international standard defined in the document "84 (secretariat) 86 I, II Draft—Domestic Digital Bus" (hereinafter referred to as Document I) issued by the "International Electrotechnical Commission" is applied as one example. The data frame format and the basic communication procedure defined in the international standard will be described below.

Figure 7:
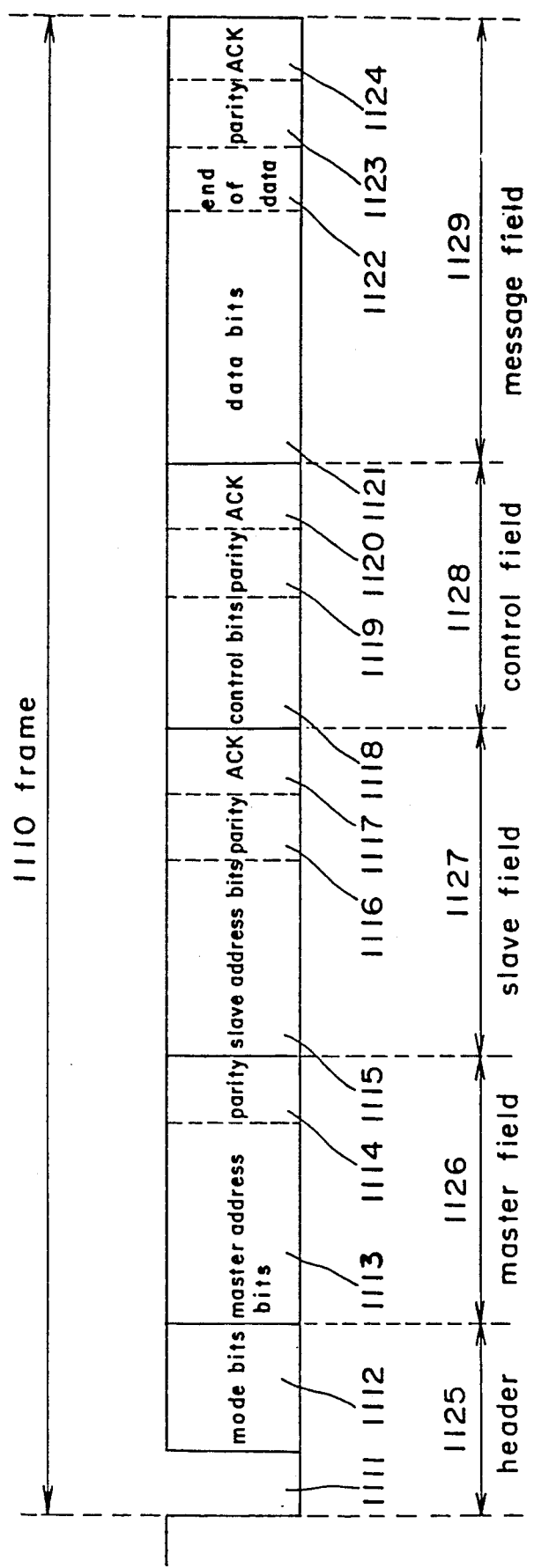
FIG. 7 is a frame block diagram used in the communication system to which the present invention is applied.

The configuration of the data frame is shown in FIG. 7. The data frame is composed of a header 1125, a master field 1126, a slave field 1127, a control field 1128, and a message field 1129. The header 1125 is composed of a start bit 1111 denoting the start of the frame, and a mode bit 1112 denoting the transfer mode. The master field 1126 is composed of a twelve-bit master address 1113 and a parity bit 1114. The slave field 1127 is composed of a twelve-bit slave address 1115, a parity bit 1116 and an ACK bit 1117. When a station specified as a slave station exists, an affirmative response is returned to the master station using the ACK bit 1117 of the slave field.

A common format is used to compose the master address 1113 and the slave address 1115. The most significant four bits denote a service type, the intermediate five bits denote a device type, and the least significant three bits denote a device number. In the Document I, <AVC service> is the only defined service type, the value thereof being "0001". The device type data is indicative of one of various AV devices. A partial list of data value assignments of different AV devices is in Table 1 shown below.

TABLE 1

| | Device Type |
|---|---|
| 00000 | VIDEO MONITOR |
| 00001 | AUDIO AMPLIFIER |
| 00010 | SWITCH BOX |
| 00011 | not defined |
| 00100 | VIDEO TAPE RECORDER |
| 00101 | VIDEO TUNING SYSTEM |
| 00110 | VIDEO DISK PLAYER |
| 00111 | CAMERA |
| 00111 | |
| 00111 | |

The device number data distinguishes devices having a same device type. Generally, the device numbers are assigned sequentially from the "000".

When the master station receives an affirmative ACK bit 1117 from a slave station, the master station continuously transmits the control field 1128 and subsequent data of the data frame. When a negative response has been received, the master suspends transfer of the data frame. The control field 1128 is composed of four control bits 1118, a parity bit 1119 and an ACK bit 1120. The control bits 1118 indicate the transmission direction of the message field 1129 in the data frame, the significance of the contents described in the message field, and the lock control. The data content of the control field is shown below in Table 2.

TABLE 2

| HEX | contents of CF | lock func. |
| --- | --- | --- |
| 0 | read slave status | not locked |
| 1 | not defined | |
| 2 | read slave status | lock |
| 3 | read data | lock |
| 4 | read lock address (M,L) | not locked |
| 5 | read lock address (H) | not locked |
| 6 | read slave status | unlock |
| 7 | read data | unlock |
| 8 | write memory address | lock |
| 9 | not defined | |
| A | write command | lock |
| B | write data | lock |
| C | not defined | |
| D | not defined | |
| E | write command | unlock |
| F | write data | unlock |

The slave stations return an affirmative response to the master station using the ACK bit 1120 when the control specified by the control bits 1118 can be accepted, and returns a negative response when the control cannot be accepted. The master station transmits the message filed 1129 when an affirmative ACK bit 1120 has been received. When a negative response has been received, the master suspends transfer of the data frame. The message field 1129 is composed of a plurality of eight-bit data blocks 1121, an end of data bit 1122 indicating the final data bit of the message field, a parity bit 1123 and an ACK bit 1124. The station specified as a receiver station in the control bits returns to the transmitter station an affirmative response or a negative response using the ACK bit 1124 each time the data bit 1124 is received by one byte. A transmitter station which receives a negative response suspends transmission of the message field.

In the system, all the stations 1002 through 1005 can function as a master station, and each can control the transmission start of the frame 1110 and the transmission timing through the specification of the slave station. However, only one station at a time can function as a master station by starting the transmission of a data frame 1110. Therefore, when a plurality of stations attempt to become master stations by effecting transmission of data frames at the same time, it is necessary to determine priority by arbitration. Also, the slave station returns a response ACK 1117 to the master station within the slave field 1127 of the frame 1110.

The distinction between a transmitter station and a receiver station is defined by the control field 1128 within the data frame 1110. When a data frame 1110 is transmitted, each affected station functions in one of four modes, namely (a) master transmitter, (b) master receiver, (c) slave transmitter or (d) slave receiver.

(2) Detailed Description of the First Embodiment of Present Invention

A picture display method in an audio video system in the first embodiment of the present invention will be described hereinafter.

(2.1) Construction of the First Embodiment

FIG. 1 shows a block diagram of an AV system to which the first embodiment is applied. Reference numeral 100 is an information transmission path which is connected to the respective stations to effect the transmission of information among the stations. Reference numeral 110 is a station having a picture display portion (monitor). Reference numerals 120, 130, ... are stations which do not have a picture display portion. Reference numerals 111, 121, 131, ... are communication control portions for effecting communication by way of the information transmission path 100. Reference numerals 112, 122, 132, ... are operation processing portions for effecting software processing. Reference numerals 113, 123, 133, are picture display processing portions for effecting data control of a picture display. Reference numeral 114 is a picture display portion (monitor) for displaying a picture (image) on a display monitor in accordance with picture data fed from the picture display processing portions 113, 123, 133, .... Reference numeral 115 is a command input portion for inputting user command with respect to the picture display.

Figure 2:
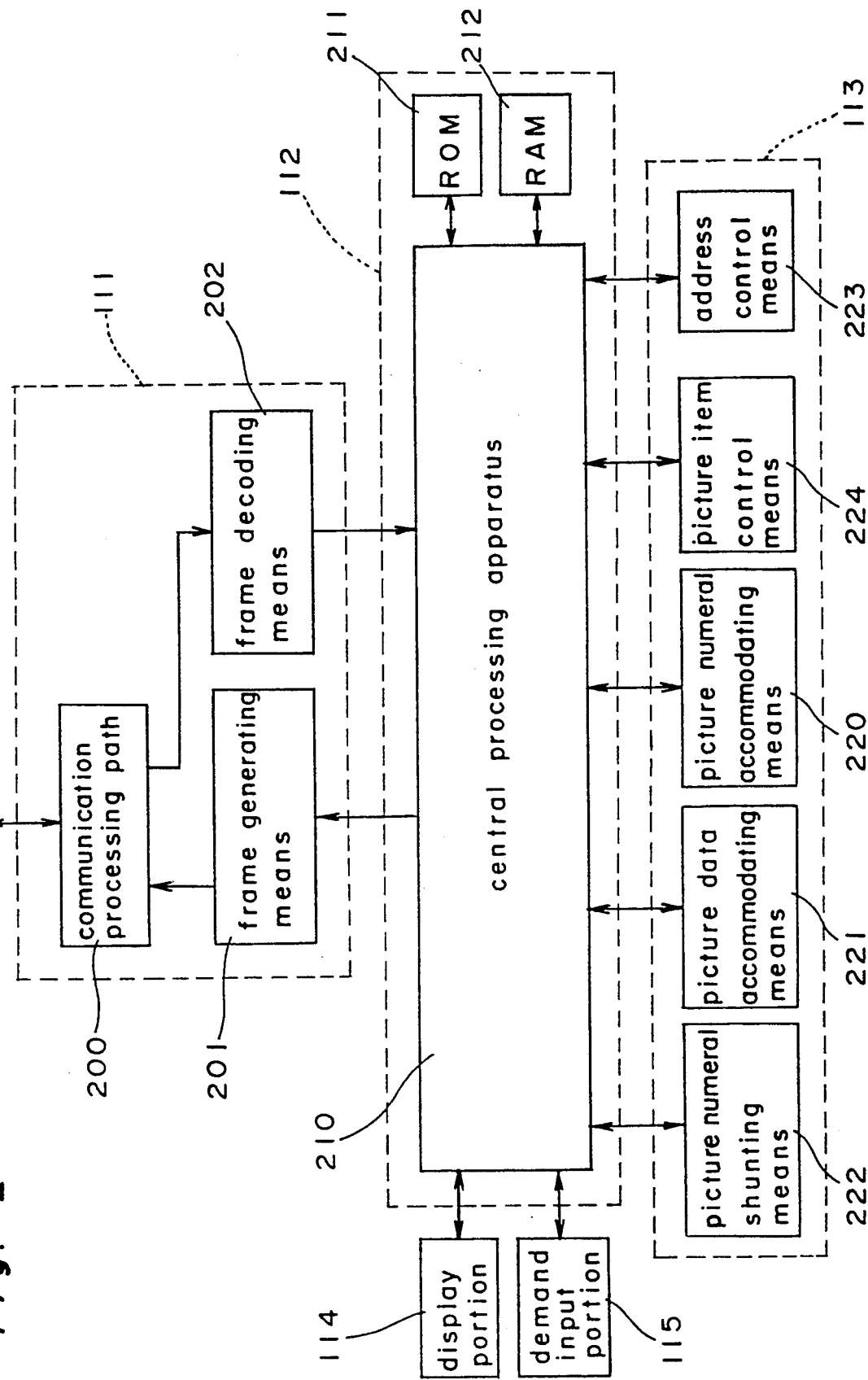
FIG. 2 is a block diagram showing the construction of a station in an embodiment of the present invention.
Figure 3:
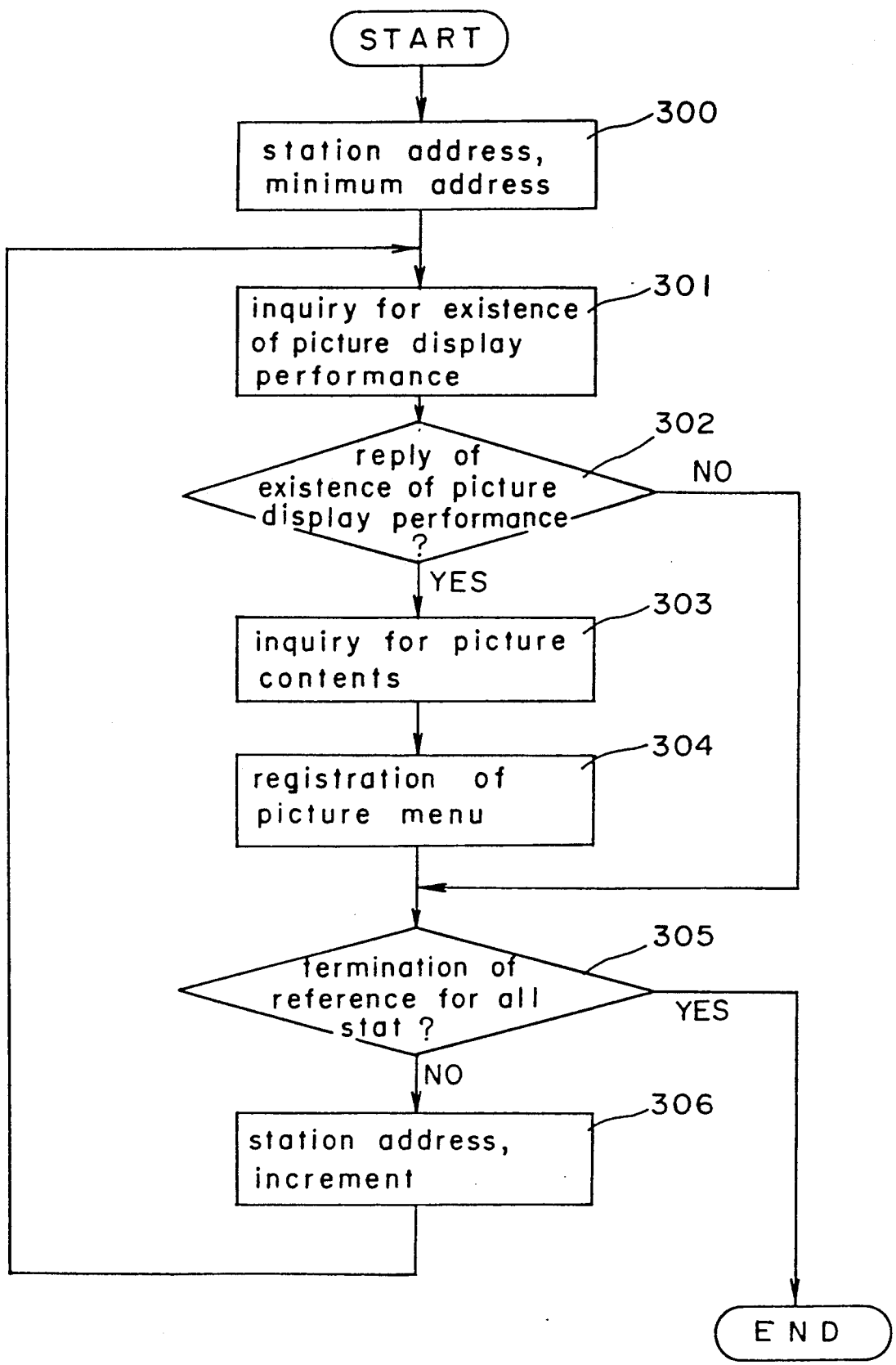
FIG. 3 is a processing flow chart for describing the operation of the embodiment of the present invention.

FIG. 2 is a block diagram of the station 110 to which the first embodiment is applied. The communication control portion 111 includes a communication processing means 200 for electrically effecting interface control of the data communication with other stations by way of the information transmission path 100, a frame generating means 201 for generating a data frame of a format necessary to the information transmission path 100 by way of the communication processing means 200, a frame decoding means 202 for decoding a data frame received by way of the communication processing means 200 from the information transmission path 100. The operation processing portion 112 includes a central processing apparatus (microprocessor) 210 for executing program of processing steps, a read only memory (ROM) 211 for accommodating the program, and a readable and writable memory (RAM) for accommodating various data when the processing steps are executed. The picture display processing portion 113 includes a picture number accommodating means 220 for accommodating the number of a presently displayed picture, a picture data accommodating means 221 for accommodating information regarding a picture to be displayed, a picture number shunting means for accommodating the picture number of the pictured displayed last when the picture of the other station is called, an address control means 223 for accommodating the results of an inquiry regarding which station connected with the information transmission path has a picture display function, and a picture item control means 224 for accommodating the item of the picture having the other station. FIG. 3 is a processing flow chart of a program to be executed by the central processing apparatus 210 in the first embodiment.

(2.2) Operation Description of the First Embodiment

The operation of the first embodiment will be described below in detail with reference to the processing flow chart of FIG. 3. The processing program described hereinafter is accommodated in the ROM 211 and executed by the central processing apparatus 210 using the RAM 212, the address control means 223 and the picture item control means 224 shown in FIG. 2.

The processing routine shown in FIG. 3 is executed in a case where the main power supply of the station is activated and when the station is newly connected to the information transmission path 100.

At the first step 300 from among the addresses of the other stations stipulated to receive data via the information transmission path 100, the address having the minimum address number is accommodated. This is an initializing process for successively sending an inquiry data frame to each station connected to the information transmission path 100.

At the step 301, an inquiry data frame regarding the absence or existence of a picture display function is transmitted to the station having the address accommodated in step 300. In particular, a corresponding command (inquiry) is generated by the central processing apparatus 210 and applied to the frame generating means 201 which configures the command into the proper frame format. The data frame thus generated by the frame generating means 201 is transferred to the communication processing means 200 for interface conversion and transmission onto the information transmission path 100. (Although the process effected by the frame generating means 201 and the communication processing means 200 are effected each time a data frame is sent out onto the information transmission path 100, a description of this process is omitted below to avoid the repetition.)

The inquiry as to the absence or existence of a picture display function is provided to determine whether or not the addressed station contains picture data for effecting some type of picture display.

At step 302, a reply received in response to the inquiry transmitted at the step 301 is analyzed so a to determine whether or not the addressed station contains picture data for display. When it has been judged that a picture display function exists, the process advances to a step 303 and the address of the addressed station is accommodated in the address control means 223. When it has been judged that a picture display function is absent, the process skips down to step 305.

At step 303, another inquiry data frame is transmitted to the addressed station to cause the addressed station to reply by transmitting picture display data.

At step 304, a picture number and picture title obtained in reply to the picture contents inquiry frame sent out at step 303 are made to correspond to the address of the addressed station to be accommodated in the picture item control means 224. By execution of this step, a table of contents is made to show which picture belongs to the address station. The picture items demanded at the step 303 and stored at step 304 may be sufficiently detailed to select using the picture number of the picture of the addressed station to be accessed from the addressed station.

At the step 305, it is decided whether or not the processing steps 301 to 304 have been executed with respect to all stations. If the processing has not been executed with respect to all stations, the process advances to the step 306. Otherwise, the present processing routine is completed.

At the step 306, the station address is incremented to identify a next station and the processing repeats the steps 301 to 305 with respect to the next station.

(3) Detailed Description of the Second Embodiment of the Present Invention

The audio video system picture displaying method of the second embodiment will be described hereinafter.

(3.1) Construction of Second Embodiment

As the construction of the second embodiment of the present invention is similar to that of the first embodiment, a description thereof is omitted.

(3.2) Operation of the Second Embodiment

The second embodiment will be described in detail with reference to FIG. 4. The picture display method in the second embodiment provides a method for allowing one station to take over the control right of the picture display from another station. The second embodiment is directed to a case where it is not required that the picture control right be restored to the original station again after the control right has been taken over by another station. The third embodiment described later is directed to the case where the control right must be restored again to the original station.

Assume that a station currently having a picture display control right is a station A, and a station which takes over the picture display control right is station B. The picture A - 1 of the station A is currently displayed as shown in (1) of FIG. 4. The user inputs an instruction via the command input portion 115 to display the picture B - 1. The process of changing the display to the picture B - 1 is executed as described hereinafter. The central processing apparatus 210 of the station A retrieves the picture B - 1 from the picture item control means 224 and retrieves, from the address control means 223, the address (in this case, the address of the station B) of the station retaining the picture when the corresponding picture exists. In the central processing apparatus 210 of the station A, the address of the station B is made the address of the addressed station so as to constitute a "BRANCH notification" frame having the contents shown in (2) of FIG. 4 in the frame command portion. In (2) of FIG. 4, the "BRANCH notification" command is accommodated in the operation code portion of the notification frame, and the picture number of the picture to be displayed first by the station which has taken over the control right of the picture processing is accommodated in the operand portion.

By the execution of the above described processings, the control right of the picture display is transferred over to the station B, and thereafter, the processings continue in accordance with the picture contents of the station B.

(4) Detailed Description of the Third Embodiment of the Present Invention

The audio video system picture display method of the third embodiment of the present invention will be described hereinafter.

(4.1) Construction of the Third Embodiment

As the construction of the present embodiment is similar to that of the first embodiment of the present invention, the description thereof is omitted below.

(4.2) Operation Description of the Third Embodiment

The present embodiment will be described in detail with reference to (3), (4) and (5) of FIG. 4. The third embodiment provides a method allowing one station to take over a control right of the picture display from an original station.

The present embodiment applies in a case where the picture control right is to be restored to the original station again after the control right of the picture display has been taken over to the other station.

Assume that a station having a control right of the picture display at present is a station A, and a station which will take over the control right of the picture display is a station B. The picture A - 1 of the station is presently displayed as shown in (3) of FIG. 4. An instruction is input by the user to display the picture B - 1 via the demand input means 115 at this time, and the processing for changing the display to the picture B - 1 is executed as described hereinafter. First, the central processing apparatus 210 of the station A shunts to the picture numeral shunting means 222 the picture number of the station of the present display. Then, the central processing apparatus 20 of the station A retrieves the picture B - 1 from the picture item control means 224 and retrieves from the address control means 223 the address (in this case, the address of the station B) of the station retaining the picture when the picture exists. In the central processing apparatus of the station A, the address of the station B is made the other address so as to constitute a "CALL notification" frame of the contents shown in (4) of FIG. 4 in the command portion. In (4) of FIG. 4, the "CALL notification" command is accommodated in the operation code portion of the notification frame, and the picture number of the picture to be displayed first by the station which has taken over the control right of the picture processing is accommodated in the operand portion. By the execution of the above described processings, the control right of the picture display is passed over to the station B, and thereafter, the processings continue in accordance with the picture contents of the station B.

Then, when the picture display processing by the control of the station B has been completed, or when the display is to be returned to the picture of the station A upon a demand of the user, the central processing apparatus 210 of the station B transfers the "RETURN notification" shown in (5) of FIG. 4 with respect to the station A calling the self-station a while ago. The station A which has received the "RETURN notification" displays again the picture (picture A - 1) displayed before calling the station B and waits for the next demand from the user.

(5) Detailed Description of the Fourth Embodiment of the Present Invention

The audio video system picture displaying method of the fourth embodiment of the present invention will be described hereinafter.

(5.1) Construction of the Fourth Embodiment

As the construction of the present fourth embodiment is similar to that of the first embodiment of the present invention, a description thereof is omitted below.

(5.2) Operation Description in the Fourth Embodiment

Figure 5A:
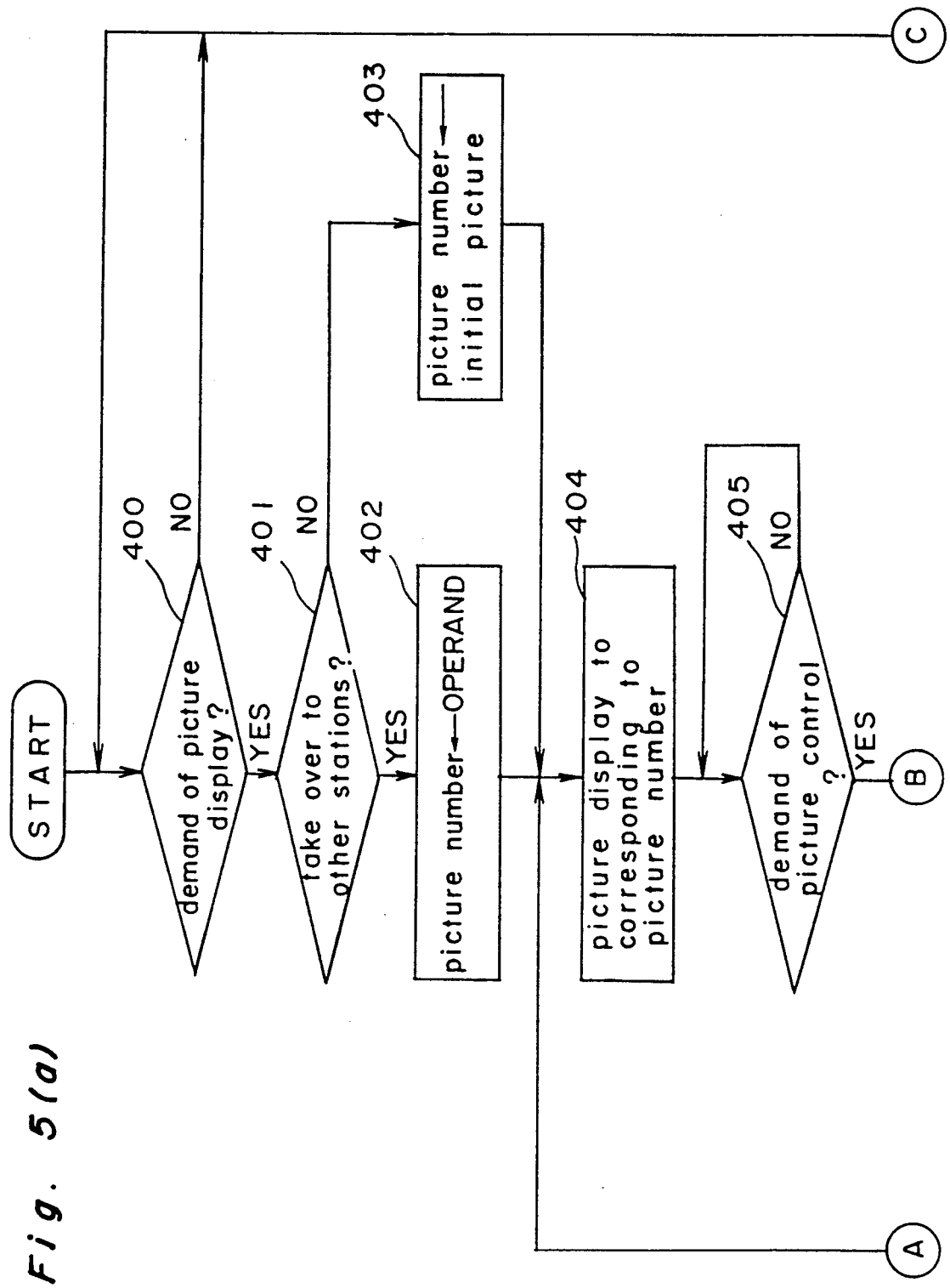
FIGS. 5(a) through 5(c) constitute another processing flow chart for describing the operation of an embodiment of the present invention.
Figure 5B:
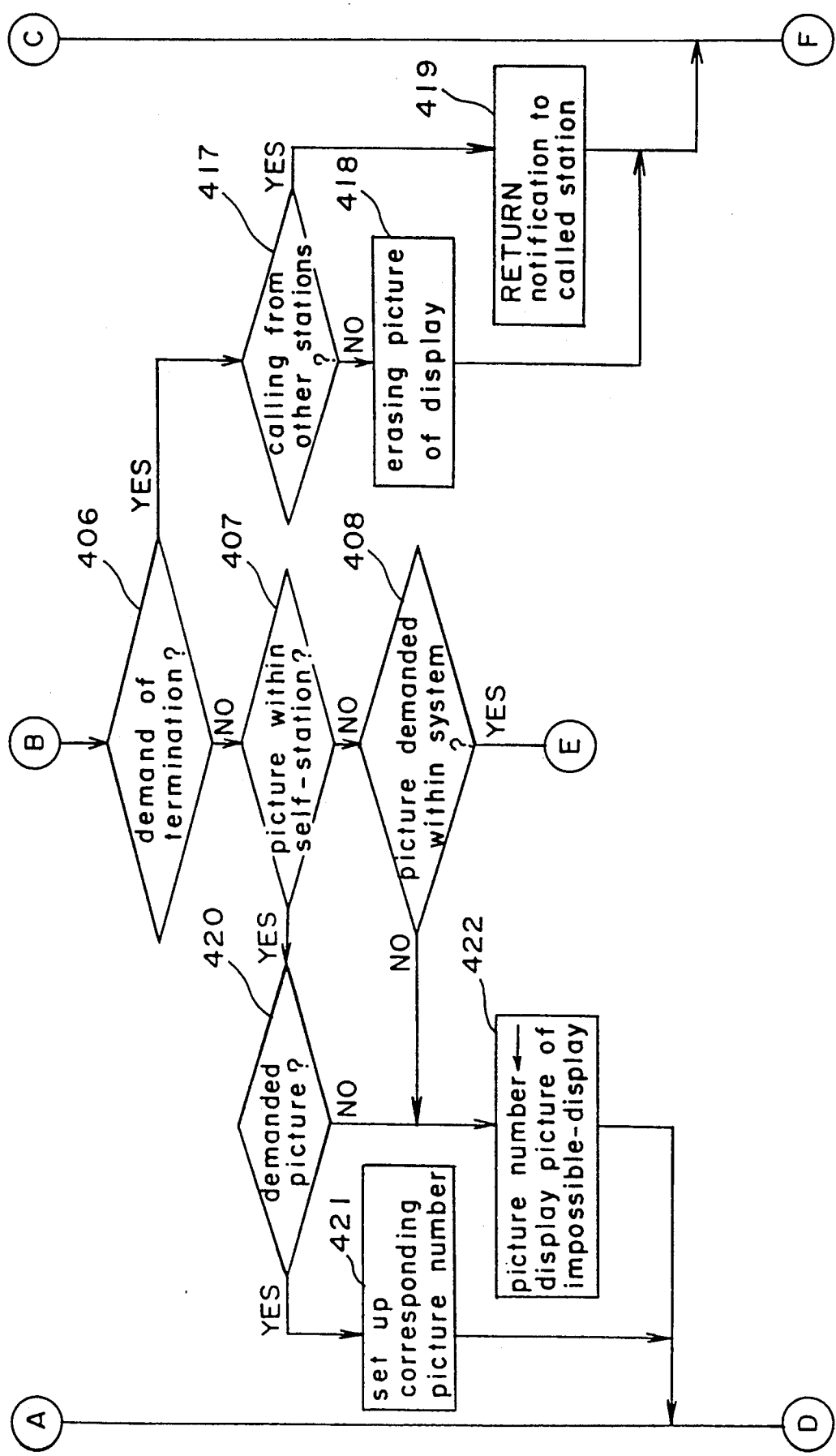
Figure 5C:
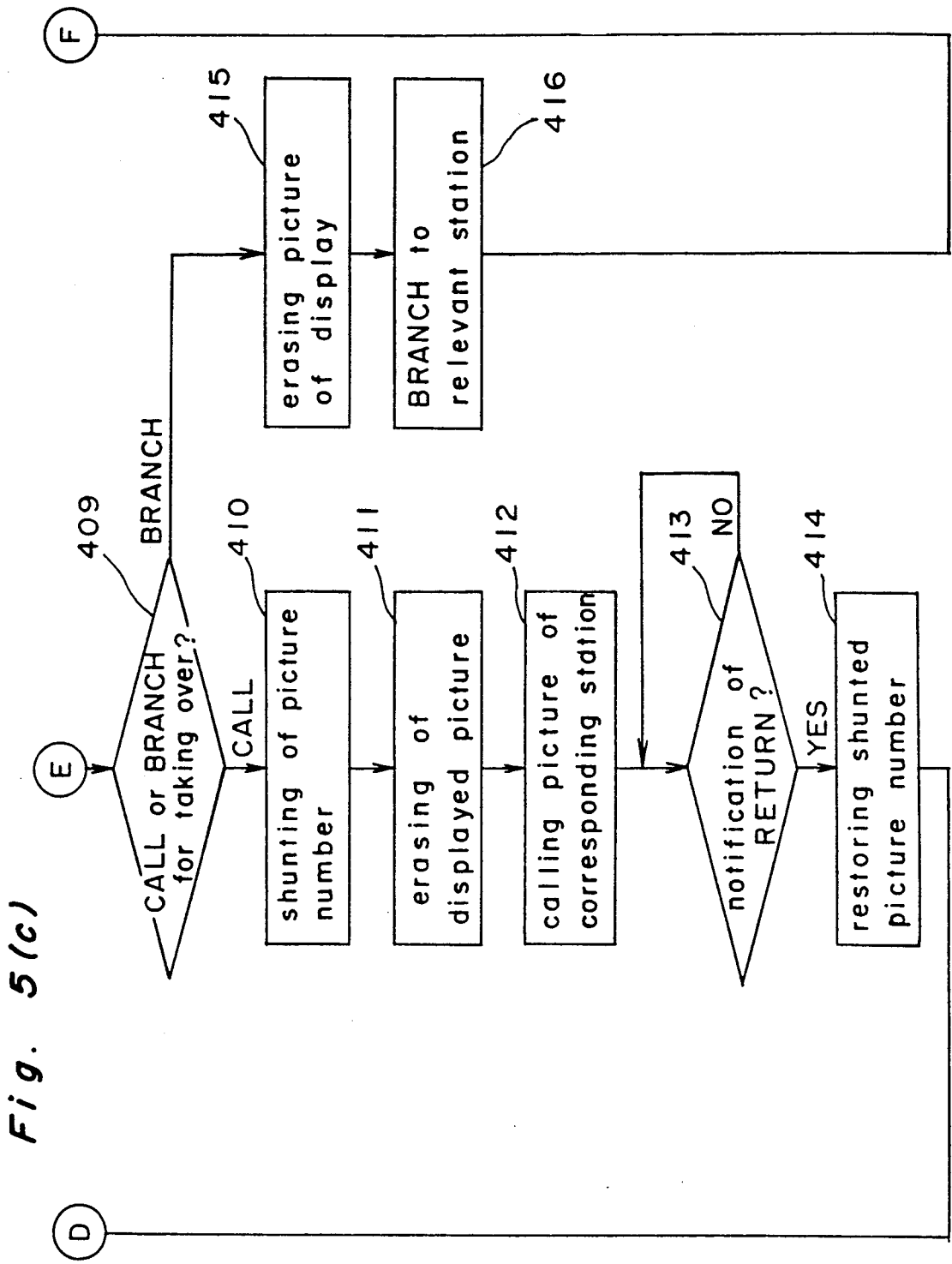

The present embodiment will be described in detail with reference to the processing flow chart of FIG. 5.

The program of the processing contents to be described hereinafter is accommodated in the ROM 211 of the respective stations described in FIG. 2, and are executed with the use of the RAM 212, the address control means 223 and the picture item control means 224 by the central processing apparatus 210. The processing routine shown in FIG. 5 is continuously executed in accordance with user demands inputted from the demand input means 115.

At the first step 400, it is decided whether or not a demand of the picture display has been inputted with respect to the station. Such demands are effected in cases where the user inputs a demand from the demand input means 115, where a demand is inputted from another station by way of the information transmission path 100, and where the central processing apparatus 210 effects spontaneously generates a demand within the same station. When a demand of the picture display has not been inputted, the step 400 is executed again. When the demand of the picture display has been inputted, the process advances to the step 401.

At the step 401, it is decided whether or not the picture display demand has been received from another station by way of the information transmission path 100. The process advances to the step 402 when the picture display has been effected by demand from the other station. The process advances to the step 403 when the demand is not from the other station, namely, when the demand is either inputted by the user from the demand input means 115 or spontaneously generated by the central processing apparatus 210 within the same station.

At the step 402, the number specified with the operand which is accompanied by the demand transmitted from the other station by way of the information transmission path 100 is stored in the picture numeral accommodating means 220 for accommodating the picture number of the picture to be displayed.

At the step 403, the picture number of the initial picture is accommodated in the picture numeral accommodating means 220 for accommodating the picture number of the picture to be displayed.

At the step 404, the picture data of the picture is read from the picture data accommodating means 221 with reference to the picture number of the picture to be displayed which is accommodated in the picture numeral accommodating means 220, so as to display the picture on the picture display means 114. When the station which is executing the processing step is a station which does not have a picture display means 114, the picture data is transferred by way of the information transmission path to the station having the picture display means 114 for display.

At the step 405, it is decided whether or not a demand which requires a next picture to be displayed instead of the picture displayed at present has been inputted from the demand input means 115. When the next picture display demand has not been made, the step 405 is executed again. When such a demand is inputted, the process advances to the step 406.

At the step 406, it is decided whether or not the demand inputted at the step 405 is a picture display end demand. If it is an end demand, the process advances to the step 417. If it is not an end demand, the process advances to the step 407.

At the step 407, it is decided whether or not the next picture of a demand from the user is a picture within the same station or a picture another station controls. When it is a picture the other station controls, it is necessary to pass over the picture control to the other station. When the picture demanded is within the same station, the process advances to the step 420. When the picture the other station is demanded, the process advances to the step 408.

At the step 408, it is checked whether or not the picture demanded at the step 405 exists within the system. This decision is made with reference to the contents thereof as to what picture exists within the system as the registration is effected within the address control means 223 and the picture item control means 224 by the procedure shown previously in the first embodiment of the present invention. When it has been decided that the demanded picture exists within the system, the process advances to the step 409. When it has been decided that the demanded picture does not exist, the process advances to the step 422.

At the step 409, it is decided whether or not the hand-over operation of the control right of the picture display is to be carried out according to the "BRANCH notification" of the second embodiment or the "CALL notification" of the third embodiment with respect to the station having the picture demanded at the step 405. The hand-over by the "BRANCH notification" or the "CALL notification" is decided by the relation between the contents of the picture being displayed at present and the contents of the picture to be displayed next. The algorithm for deciding which hand-over method is adopted is not defined in particular in the present invention. The process advances to the step 415 when the hand-over by the "BRANCH notification" is adopted. When the hand-over by the "CALL notification" is adopted, the process advances to the step 410.

At the step 410, since it was decided that the hand-over by the "CALL notification" is used at the step 409, the picture number being displayed at present is shunted to the picture numeral shunting means 222 so as to advance to the next step 411.

At the step 411, the picture display at present is erased and the process advances to the next step 412.

At the step 412, the "CALL notification" with the picture numeral corresponding to the demanded picture being added as an operand is transmitted by way of the information transmission path 100 with respect to the station having the picture demanded by the user. At a time point when the "CALL notification" has been transferred, the picture control right is handed over to the corresponding station from the original station.

At step 413, the process waits for the "RETURN notification" to be sent back from the station where the control right of the picture has been handed over at the step 412. The step 413 is repeatedly executed until the "RETURN notification" is received, and then the process advances to the next step 414.

At the step 414, the control right of the picture is handed over to the original station again, so that the picture number shunted to the picture numeral shunting means 222 is restored at the step 410 so as to return to the step 404 for display of the picture. The process advances to the step 415 in a case where the hand-over by the "BRANCH notification" is adopted at the step 409. At the step 415, the picture display at present is erased so as to advance to the step 416.

At the step 416, the "BRANCH notification" with the picture number corresponding to the demanded picture being added as an operand is transmitted by way the information transmission path 100 to the station having the picture demanded by the user at the step 405. At a time point when the "BRANCH notification" has been transferred, the picture control right is handed over to the corresponding station from the original station. As the original station completes all the pictures display processings, the process returns to step 400 waiting for the next picture display demand to be inputted.

When the picture control demand inputted from the user at the step 405 is an end demand at the step 406, the process advances to the step 417. The original station decides at present whether or not the picture control right is handed over by the "CALL notification" from the other station. When it has been decided that the picture control right has been handed over by the "CALL notification" from the other station, the process advances to the step 418. When the picture control right is handed over by the "CALL notification", the process advances to the step 419.

At the step 418, the picture displayed at present is erased. As all the picture display processings are completed at this time, the process returns to the step 400 waiting for the next picture display demand to be inputted.

At the step 419, all the picture display processings at the station are completed, and the control right of the picture is handed over by the "CALL notification" from the other station at present. The "RETURN notification" for returning the control right to the former station where the control right of the picture has been handed over by the "CALL notification" to the station is transferred by way of the information transmission path 100. Since the station has completed all the picture display processings at a time when the processing for transferring the "RETURN notification" has been executed, the process returns to the step 400 waiting for the next picture display demand to be inputted.

When the content of the picture control demand inputted from the user at the step 405 has been decided at the step 407 to be a picture retained within the same station, the process advances to the step 420 so as to decide whether or not the demanded picture exists within the same station by the step 407 with reference to the picture data accommodating means 221. When the corresponding picture exists in the picture data accommodating means 221, the process advances to step 421. When it does not exist, the process advances to the step 422.

At the step 421, the picture number of the picture demanded by the user at the step 405 is accommodated in the picture numeral accommodating means 220, and thereafter, the process advances to the step 404 for displaying the picture corresponding to the picture number.

At the step 422, the picture number corresponding to a display picture for displaying that the picture demanded at the step 405 is impossible is accommodated in the picture numeral accommodating means 220, and thereafter, the process advances to the step 404 for displaying the picture corresponding to the picture number.

Although the present invention has been fully described by way of example with reference to the accompanying drawings, it is to be noted here that various changes and modification will be apparent to those skilled in the art. Therefore, unless otherwise such changes and modifications depart from the scope of the present invention, they should be construed as included therein.

What is claimed is:

1. A multistation display system comprising:
   a plurality of information display stations each for executing respective data processings and generating corresponding display information; and,
   an information transmission path commonly connected to said plurality of information display stations for transmitting data frames among said plurality of information display stations to provide data communication between said plurality of information display stations;
   wherein at least one of said plurality of information display stations comprises (a) a communication control portion coupled to said information transmission path and including (i) communication processing means for transmitting data frames onto and receiving data frames from said information transmission path, (ii) frame decoding means for decoding data frames received by said communication processing means from said information transmission path, and (iii) frame generating means for generating data frames transmitted onto said information transmission path by said communication processing means, (b) an operation processing portion coupled to said communication control portion and including (i) a central processor means for executing display processing operations, and (ii) a memory means for storing data used by said central processor means upon executing the display processing operations, (c) a display processing portion coupled to said operation processing portion and including (i) a display data accommodation means for storing display information data indicative of the display contents of display information, (ii) a display number accommodating means for accommodating a display number associated with each display of each display information, and (iii) an address accommodation means for selectively storing addresses of other ones of said plurality of information display stations associated with display information data stored in said display data accommodation means, (d) a display monitor coupled to said operation processing portion, and (e) an input means, coupled to said operation processing portion, for inputting user commands, wherein said operation processing portion is responsive to a user command from said input means to execute a CALL NOTIFICATION sequence for transferring a display displayed on said display monitor from a first display associated with said at least one station to a second display associated with another of said plurality of information display stations, said CALL NOTIFICATION sequence including transmitting to the other station a display transfer notification and an operand information specifying a display number of the second display, wherein a control right of the display of said display monitor is transferred to the other station and the second display is displayed on said display monitor, and then receiving a return notification which is transmitted by the other station upon completion of display processing specified by the transfer notification and operand information, and, responsive to the return notification, restoring the control right of the display of said display monitor to said at least one station and display the first display on said display monitor.

2. A multistation display system comprising:

a plurality of information display stations each for executing respective data processings and generating corresponding display information; and, an information transmission path commonly connected to said plurality of information display stations for transmitting data frames among said plurality of information display stations to provide data communication between said plurality of information display stations;

wherein at least one of said plurality of information display stations comprises (a) a communication control portion coupled to said information transmission path and including (i) communication processing means for transmitting data frames onto and receiving data frames from said information transmission path, (ii) frame decoding means for decoding data frames received by said communication processing means from said information transmission path, and (iii) frame generating means for generating data frames transmitted onto said information transmission path by said communication processing means, (b) an operation processing portion coupled to said communication control portion and including (i) a central processor means for executing display processing operations, and (ii) a memory means for storing data used by said central processor means upon executing the display processing operations, (c) a display processing portion coupled to said operation processing portion and including (i) a display data accommodation means for storing display information data indicative of the display contents of display information, (ii) a display number accommodating means for accommodating a display number associated with each display of each display information, and (iii) an address accommodation means for selectively storing addresses of other ones of said plurality of information display stations associated with display information data stored in said display data accommodation means, (d) a display monitor coupled to said operation processing portion, and (e) an input means, coupled to said operation processing portion, for inputting user commands, wherein said operation processing portion includes means for causing said communication control portion to generate a first data frame to said plurality of information display stations containing a first inquiry as to whether each of said plurality of information display stations includes respective display information, for storing in said address accommodation means the addresses of each of said plurality of information display stations which transmit an affirmative reply in response to said first inquiry, for causing said communication control portion to generate a second data frame to said plurality of information display stations which include respective display information containing a second inquiry as to the contents of the respective display information, and for storing in said display data accommodation means the contents of the respective display information transmitted by said plurality of information display stations in response to said second inquiry, wherein said operation processing portion is responsive to a user command from said input means to execute a BRANCH NOTIFICATION sequence for transferring a display displayed on said display monitor from a first display associated with said at least one station to a second display associated with another of said plurality of information display stations, said BRANCH NOTIFICATION sequence including transmitting to the other station a display transfer notification and an operand information specifying a display number of the second display, wherein a control right of the display of said display monitor is transferred to the other station and the second display is displayed on said display monitor, and wherein said operation processing portion is also responsive to a user command from said input means to execute a CALL NOTIFICATION sequence for transferring a display displayed on said display monitor from a first display associated with said at least one station to a second display associated with another of said plurality of information display stations, said CALL NOTIFICATION sequence including transmitting to the other station a display transfer notification and an operand information specifying a display number of the second display, wherein a control right of the display of said display monitor is transferred to the other station and the second display is displayed on said display monitor, and then receiving a return notification which is transmitted by the other station upon completion of display processing specified by the transfer notification and operand information, and, responsive to the return notification, restoring the control right of the display of said display monitor to said at least one station and display the first display on said display monitor.

* * * * *